Jan. 22, 1929.

A. O. DADY ET AL 1,700,029

ELECTRICALLY OPERATED VALVE

Filed April 28, 1926   3 Sheets-Sheet 1

INVENTORS
A. O. DADY
L. R. TEEPLE
BY C. B. Birkenbeuel
ATTORNEY.

Jan. 22, 1929.
A. O. DADY ET AL
1,700,029
ELECTRICALLY OPERATED VALVE
Filed April 28, 1926  3 Sheets-Sheet 2
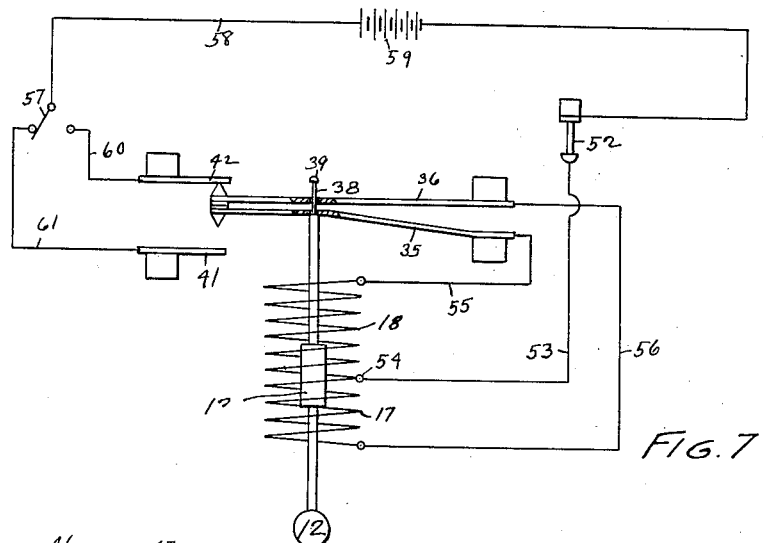
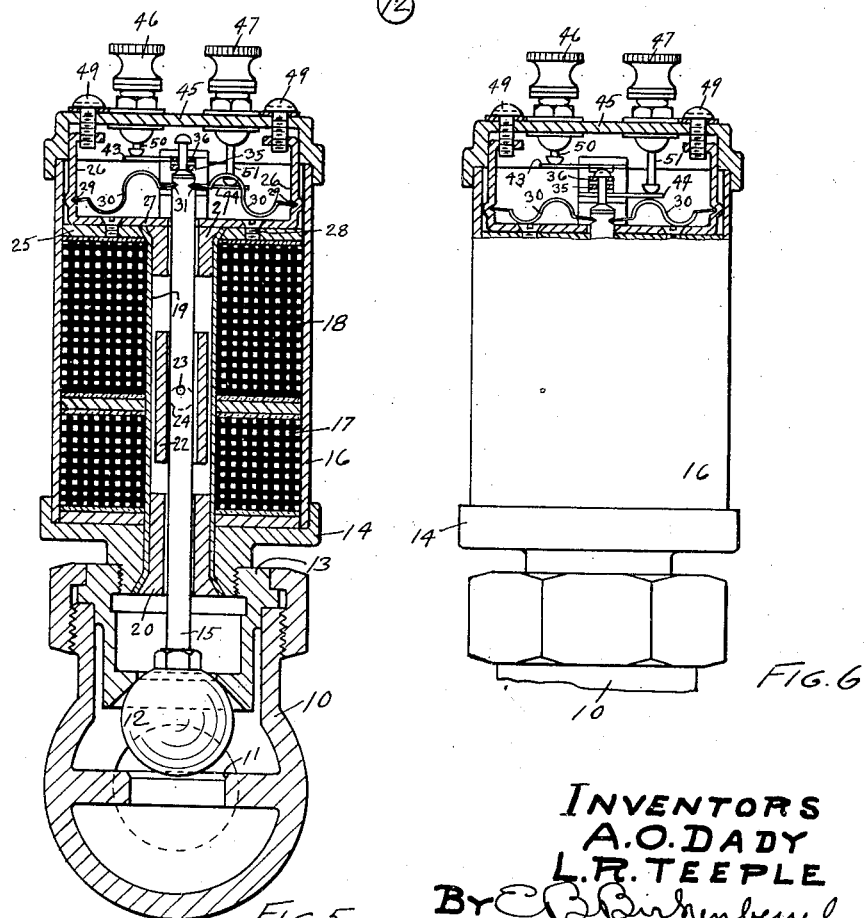
INVENTORS
A.O. DADY
L.R. TEEPLE
BY ATTORNEY.

Jan. 22, 1929.

A. O. DADY ET AL 1,700,029

ELECTRICALLY OPERATED VALVE

Filed April 28, 1926     3 Sheets-Sheet 3

INVENTORS
A. O. DADY
L. R. TEEPLE
BY C. B. Birkenbeuel
ATTORNEY.

Patented Jan. 22, 1929.

1,700,029

UNITED STATES PATENT OFFICE.

ARTHUR O. DADY AND LAWRENCE R. TEEPLE, OF PORTLAND, OREGON.

ELECTRICALLY-OPERATED VALVE.

Application filed April 28, 1926. Serial No. 105,067.

This invention relates generally to electrically operated valves, and particularly to a special form of circuit closing and valve actuating mechanism.

The main object of this invention is to produce a special form of electrically operated valve which will be extremely dependable in operation and at the same time readily lend itself to production under present day methods.

The second object is to so construct the device that the valve will be opened and closed with a quick positive action, which is accomplished by means of a special form of toggle mechanism whose arms vary in length for the purpose of securing the maximum thrust near the extreme ends of the valve stem travel.

Figure 2:
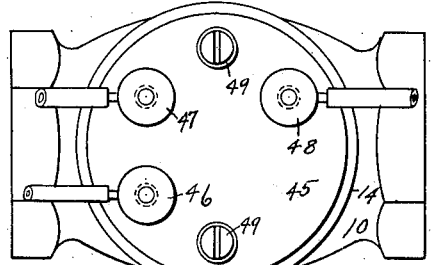
Figure 3:
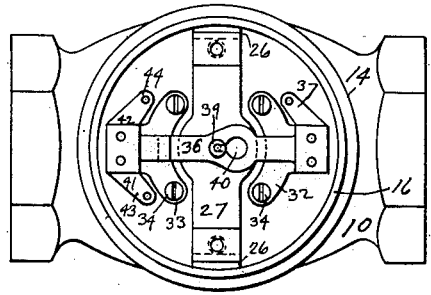
Figure 1:
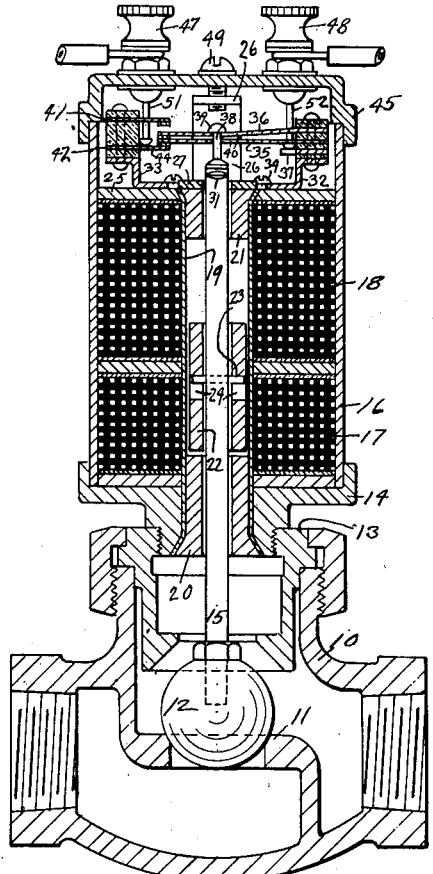
Figure 4:
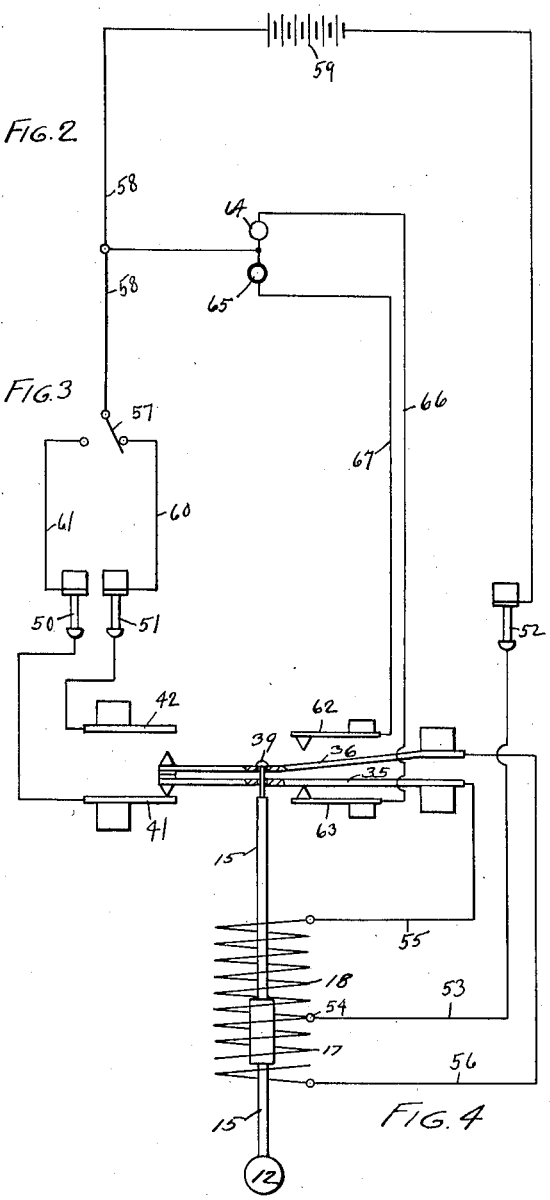
Figure 8:
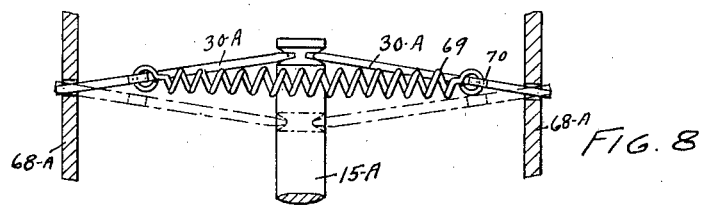
Figure 9:
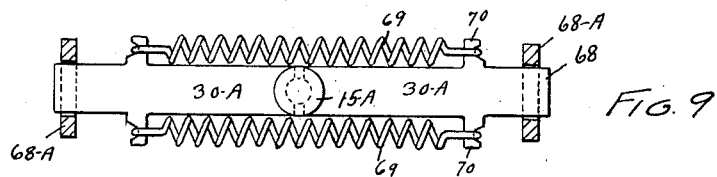
Figure 10:
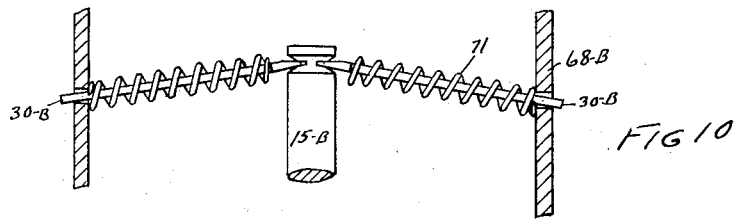
Figure 11:
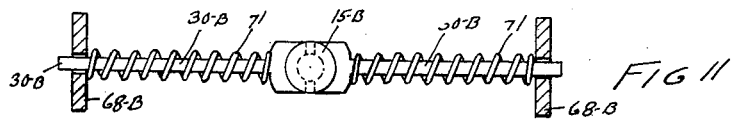
Figure 12:
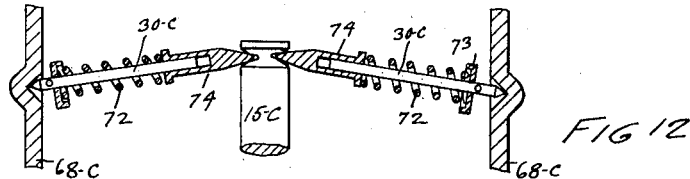
Figure 13:
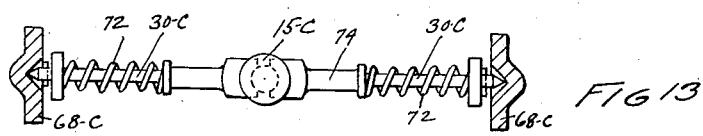

These, and other objects, will become more apparent from the specification following as illustrated in the accompanying drawings, in which:

Figure 1 is a vertical section through the device. Figure 2 is a plan of Figure 1. Figure 3 is a plan of the device with the cover removed. Figure 4 is a diagrammatic view of the wiring. Figure 5 is a transverse vertical section through the device showing the position of the toggles with the valve open. Figure 6 is a side elevation of the device with a portion broken away to show the position of the toggle when the valve is closed. Figure 7 shows a second form in which the device may be wired. Figure 8 is a vertical section through a modified form of toggle of which Figure 9 is a plan. Figure 10 is a vertical section through a second modified form of toggle of which Figure 11 is a plan. Figure 12 is a vertical section through a third modified form of toggle of which Figure 13 is a plan.

In the plan views 9, 11 and 13 the fulcrums are broken away in section to give a clearer understanding of the device.

Similar numbers of reference refer to the same parts throughout the several views.

Referring in detail to the drawings, in order to illustrate the invention there is shown the usual type of valve having a body 10, seat 11, ball 12 and sleeve 13 into which is screwed a base 14. The ball 12 is provided with a stem 15 by means of which the ball 12 is operated.

Within the casing 16 are placed the solenoids 17 and 18 having a tubular brass core 19 into whose lower end is placed a steel plug 20 and in whose upper end is placed a similar plug 21. The stem 15 passes through the plugs 20 and 21 and has mounted on same a core 22 adapted to slide on the stem 15 a short distance, due to the fact that it is held in place by a small pin 23 within the large holes 24 in the core 22.

Turning now to this invention it will be seen that the washer 25 on top of the solenoid 18 acts as a base for the toggle posts 26 whose connecting member 27 is fastened to the washer 25 by means of the screws 28. Each of the posts 26 is provided with a small recess 29 which forms a fulcrum for the reverse bend spring toggle arms 30 whose opposite ends engage notches 31 in the upper end of the stem 15.

On opposite sides of the member 27 are mounted the contact arm standards 32 and 33 which are secured to the washer 25 by means of the screws 34. The member 32 has mounted thereon the insulated arms 35 and 36 and the contact arm 37. A pin 38, whose head 39 can pass through the openings 40 in the members 35 and 36, passes through both of the members 35 and 36 and serves to pull same downwardly when the valve is closed.

On the standard 33 are mounted the insulated arms 41 and 42 between whose contact points operate the ends of the members 35 and 36. It is preferable to provide an ear 43 on the member 41 and an ear 44 on the member 42. For manufacturing reasons the members 41 and 42 are duplicate.

A cap 45 is provided to cover the top of the casing 16 and has mounted thereon the binding posts 46, 47 and 48 and is held in place by means of the screws 49 which are threaded into the upper ends of the members 26. The binding post 46 is provided with a downwardly projecting pin 50 which connects with the ear 43. The post 47 has a downwardly projecting pin 51 which connects with the ear 44. The post 48 has a downwardly projecting pin 52 which connects with the contact arm 37. This arrangement permits the cap 45 to be easily removed or replaced for adjustment or replacement of parts.

Turning now to the diagram shown in Figure 7 it will be observed that the pin 52 under the post 48 is connected by a wire 53 to a common pole 54 for both solenoids 17 and 18.

The former solenoid 17 acts with gravity and serves to pull the stem 15 downwardly and close the valve, while the upper solenoid 18 acts against gravity and serves to pull the stem 15 upwardly and open the valve.

The lower arm 35 is connected by means of a wire 55 to the second pole of the valve opening solenoid 18. The arm 36 is connected by means of a wire 56 to the second pole of the valve closing solenoid 17. The switch 57, preferably in the form of a thermostat, is connected by the wire 58 to the battery 59 which, in turn, is connected to the binding post 48 over the pin 52. The switch 57 may connect either through the wire 60 to the arm 42, or through the wire 61 to the arm 41.

Turning now to Figure 4, which is similar to Figure 7, except that it shows the valve in the closed position and also indicates the position of the pins 50 and 51, as well as including an auxiliary circuit consisting of a contact 62 which can engage the arm 36 when raised, and a contact 63 which can engage the arm 35 when lowered. The latter closes a circuit through the lamp 64 and the battery 59, and the former contact 62 closes a circuit through the lamp 65 and the battery 59 through their respective wires 66 and 67. Such elements would obviously be useful for indicator or signal lamps adapted to possibly indicate the position of the ball 12 near by or remote from the valve itself.

In Figure 7 the location of the pins 50 and 51 has been omitted for the purpose of simplifying the diagram.

In Figures 8 and 9 the modification therein disclosed covers a variable length toggle, or rather a toggle whose distance between its hinges varies for the purpose of securing the improved action suggested in the statements as to the object of the invention. In this case the stem 15—A has placed on each side thereof a stiff toggle arm 30—A whose ends 68 slidably pass through the fixed supports 68—A. The opposite toggles are urged together by means of the springs 69 which are attached thereto by means of the projecting lugs 70.

In the form shown in Figures 10 and 11 the stem 15—B is provided on each side with a rigid toggle arm 30—B around each of which is placed a spring 71 which bears against the rigid support 68—B, through which the arm 30—B slidably passes.

In the form shown in Figures 12 and 13 the stem 15—C is provided on each side with a telescoping toggle arm 30—C whose spring 72 is placed between the washers 73 and the slidable point 74. In this form the supports 68—C are also rigid.

The operation of the device in all of its forms is as follows: When the switch 57 is moved to the position shown in Figure 4, which is the closed position of the valve, which has been caused by the closing of the circuit through the lower solenoid 17, the stem 15 immediately draws the contact arms 35 and 36 downwardly and breaks the circuit through the lower solenoid, thereby preventing undue waste of electrical energy or causing an over-heating of the coil. Since the valve can be so placed that the pressure being controlled is above the ball 12, it is seen that the assistance of the lower solenoid is not required, especially in view of the fact of the peculiar construction of our toggle members, which are of variable length and so operate as to have the minimum amount of effect on the stem 15 during the time which the solenoids have their greatest effect, or while the core is passing over the critical point in the toggle. In other words—the spring in the toggle tends to further assist in the seating of the valve.

If the switch 57 is now moved to the position shown in Figure 7, the upper solenoid 18 becomes energized and the stem 15 immediately pushes the arms 35 and 36 out of contact, but not until the toggle arms 30 have carried the valve stem 15 to its uppermost position where they hold it in an open position until the lower magnet is again energized.

It is a well known fact that toggle levers have long been employed for the purpose of securing an excess throw for ratchets and switches of various kinds, in many instances the ends of the toggles resting against yieldable fulcrums, in which event the toggle arm maintains its uniform length. With our device the arm is shortest as the toggle passes its critical point, thereby resulting in the greatest thrust on the stem for the extreme positions.

It will be borne in mind that the employment of toggle elements in devices of the kind herein described is somewhat hampered, owing to the relatively large throw required on the valve when compared with the small amount of space available within the solenoid casing, and it is for the purpose of best utilizing this small space for the securing of a somewhat large movement that we have constructed our device as above described.

Referring again to Figures 8 and 9 it will be observed that the exact size and strength of the springs 71 is unimportant since they act in parallel across very short spaces, and the pressure against opposite sides of the stem 15—A must be alike.

We are aware that many forms of toggle levers have been employed in the past; we therefore do not desire to cover such devices broadly, but we do intend to cover all such forms and modifications thereof as fall fairly within the appended claims.

We claim:

1. A valve operating device having in combination with a pair of coaxial solenoids; a slidable core within said solenoids adapted to be moved in opposite directions thereby; a stem attached to said core projecting from said solenoids; and a pair of variable length toggle arms consisting of reversely bent flat spring arms mounted on opposite sides of said stem and engaging therewith and having fixed fulcrums supporting the outer ends thereof, the under side of the outermost portion of each curved arm bearing against a support when in a lowered position.

2. A valve operating device having in combination with a pair of coaxial solenoids; a slidable core mounted within said solenoids; a valve actuated stem attached to said core; a pair of variable length toggle arms mounted on opposite sides of said stem, one end of each toggle arm engaging said stem and the opposite end pivotally mounted in fixed supports, said arms being subject to bending moments in the lowermost portion of their travel; and a pair of insulated adjacent contact arms actuated by said stem adapted to close one side of a circuit through each solenoid separately in readiness for the closing of the other side of its circuit by external switching means.

3. A valve operating device having in combination with a pair of solenoids, a core within said solenoid; a stem adapted to be moved longitudinally in opposite directions by said core; a pair of adjacent insulated contact arms connected to the outer ends of said solenoids; a pair of contacts on opposite sides of said contact arms adapted to be connected through an external switch to the adjacent sides of the solenoids; means operated by said stem to move said contact arms to engage the contact of one solenoid when the opposite solenoid is energized; and a pair of variable length spring-urged toggle arms on opposite sides of said stem having fixed fulcrums therefor adapted to permit said toggle arms to be shortened as they pass their critical points.

LAWRENCE R. TEEPLE.
ARTHUR O. DADY.